United States Patent
Dailey (10) Patent No.: US 10,568,353 B1
(45) Date of Patent: Feb. 25, 2020

(54) HARD-SHELLED NUT MEAT EXTRACTOR

(71) Applicant: Carleton Dailey, Coral Springs, FL (US)

(72) Inventor: Carleton Dailey, Coral Springs, FL (US)

( * ) Notice: Subject to any disclaimer, the term of this patent is extended or adjusted under 35 U.S.C. 154(b) by 0 days.

(21) Appl. No.: 16/252,832

(22) Filed: Jan. 21, 2019

(51) Int. Cl.
*A23N 5/08* (2006.01)
*A23N 5/00* (2006.01)

(52) U.S. Cl.
CPC .............. *A23N 5/00* (2013.01); *A23N 5/002* (2013.01); *A23N 5/08* (2013.01)

(58) Field of Classification Search
CPC . A23N 5/00; A23N 5/002; A23N 5/08; A23N 5/004; A23N 5/006; A23N 5/008
USPC ........................ 99/574, 575, 581, 625, 628
See application file for complete search history.

(56) References Cited

U.S. PATENT DOCUMENTS

| | | | | |
|---|---|---|---|---|
| 1,688,966 A | * | 10/1928 | Hill ...................... | A23N 5/00 99/575 |
| 3,347,295 A | * | 10/1967 | Feiling ................ | A23N 5/008 241/261.1 |
| 4,996,917 A | * | 3/1991 | Burlock ................ | A23N 5/00 99/518 |
| 8,267,009 B2 | * | 9/2012 | Andreasen ............ | A47J 43/26 99/575 |
| 8,601,942 B2 | * | 12/2013 | Dailey, Jr. ............. | A23N 5/00 99/574 |

* cited by examiner

*Primary Examiner* — Reginald Alexander (74) *Attorney, Agent, or Firm* — Melvin K. Silverman (57) ABSTRACT

A system for hard-shelled nut cracking and nut meat extraction having a substantially hollow main housing, a hopper contained in the upper section of the housing, a concentric cylindrical rotor housing in the midsection of the main housing lined with a series of protrusions on the inner walls, a frustoconical shaped rotor, the rotor made up of elongate edged rods evenly spaced to have short rectangular shaped rods fixed in between the interstitials at a lower side of the rotor, the rotor is driven by a motor at the lower section of the main housing that connects to a gearbox which further connects to a vertical drive shaft that translates rotation to the rotor, the rotor and inner wall protrusions of the rotor housing are used for the cracking and meat extraction of hard-shelled nuts which are ejected from the midsection of the main housing to the collection tray.

15 Claims, 6 Drawing Sheets

HARD-SHELLED NUT MEAT EXTRACTOR

FIELD OF THE INVENTION

The invention relates to an apparatus for the cracking of nut shells and the extraction of nut meat from the shells thereof.

BACKGROUND OF THE INVENTION

In the business of processing nuts of various types, the de-shelling or cracking of a walnut shell, more specifically the black walnut, has presented a continual problem for many years. Further, with growth of demand, the need for a more efficient nut meat extraction system capable of high rates of production of walnut meat has increased.

Further, not all nuts are cracked or hulled in the same manner and, therefore, an apparatus applicable to one type of nut may be inappropriate or inefficient with respect to another type of nut.

Black walnuts, *juglans nigra*, have been particularly challenging for purposes of cracking, hulling and separation of the nut meat from the nut shell. Black walnuts are a native tree to North America. The fruit of that tree, the actual black walnut, is made of a non-splitting shell which is quite thick as compared to other nuts and houses a rich and nutritious nut meat.

The prior art, known to the inventor, is represented by U.S. Pat. No. 6,588,328 (2003) to Quantz et al; U.S. Pat. No. 6,516,714 (2003) to Warmack, U.S. Pat. No. 4,993,155 (1991) to Andrews, and U.S. Pat. No. 4,448,115 (1984) to Volk, Sr. which, however, is particular to the hulling of pistachio nuts. Some related mechanisms have been suggested for the peeling of certain varieties of seeds such as sunflower seeds as is reflected in WIPO application WO/2008/024036 to Aboras. U.S. Pat. No. 8,201,494 (2012) to Savage, show a high speed and high production nut cracker that is fed by conveyor to multiple cracking elements, such is more expensive and less efficient than the present invention and has more moving parts which could potentially break and call for more stringent maintenance. Further, U.S. Pat. No. 7,481,157 (2005) to Andreason, a similar design to that of the present invention is disclosed, but aspects of the cracking elements within the rotor and cracking walls differ extremely and the present invention is comprised of such cracking elements which provide more efficient, effective, and sound in delivery of high volume of hard-shelled nut meat at higher rates than what is deliverable by Andreason.

The Inventor has previously obtained a patent on a nut cracking invention for pecans, U.S. Pat. No. 8,601,942 to Dailey (2011). The present invention is similar in stature to that of Dailey but has incorporated multiple inventive cracking mechanisms which will allow for the more efficient cracking of the much harder shelled black walnut. None of the above structures or systems are however practical for the accomplishment of suitably efficient cracking or nut hulling, particularly without damage to the black walnut meat or mixing of the nut meat with the nut shells.

All of the above long felt limitations and needs of the prior art in the area of nut cracking and hulling are addressed by the instant invention which, it is noted, is equally applicable to the hulling of multiple types of walnuts and other hard-shelled nuts.

SUMMARY OF THE INVENTION

A system for hard-shelled nut cracking and nut meat extraction, more specifically black walnuts, includes a substantially hollow main housing that has an upper section, lower section, midsection, and a base. The lower section has a gearbox contained within at the base. A motor sits near the gear box; the motor has a horizontal driveshaft that connects with a distal end of a gear train that is within the gear box. A vertical drive shaft having an upper and lower end is connected at the lower end to a proximal end of the gear box and is also connected at the upper end to a substantially hollow frustoconical shaped rotor. The rotor has an upper surface, lower surface, and side face. Along the side face are a multiplicity of elongate edged bars, each elongate edged bar is spaced apart from the next; connected in between the elongate edged bars are short rectangular bars at the lower surface of the side face of the rotor. The rotor is housed within a concentric cylindrical rotor housing; the rotor housing has an inner and outer wall. The cylinder is housed within the midsection of the substantially hollow main housing. The inner wall of the rotor housing is lined with a plurality of small protrusions that are spaced apart, at a lower section of the inner wall is a plurality of first stage vertical protrusions spaced evenly around the middle section of the inner wall and a plurality of second stage vertical protrusions spaced evenly around the lower section of the inner wall. A collection tray is included and positioned directly below the bottom of the concentric cylinder rotor housing. A hopper is included having an upper opening, a lower opening, and a midsection. The midsection of the hopper is positioned at an end of the upper section of the substantially hollow main housing, the lower opening is exposed to the concentric cylinder.

It is accordingly an object of the present invention to provide a nut cracking system capable of high speed extraction of hard shelled nut meat from the shells thereof.

It is a further object of the invention to provide a system of high speed separation of hard-shelled nut meat from nut shells without penetration of the nut shells into the meat which is extracted therefrom.

It is a yet further object to provide an apparatus capable of simple, economical and high speed extraction of hard-shelled nut meat from the shells thereof.

It is another object to provide an apparatus of the above type in which the parts thereof will function for a considerable period without requirement for service.

It is a further object of the invention to provide a nut cracking apparatus that may be successfully configured to accommodate any size black walnut, while providing an apparatus requiring only minimal supervision during its operation.

It is another object to provide a system of the above type which is compact, low in cost, and reliable in operation for repeated long-term high speed use without loss of efficiency in the cracking of hard-shelled nuts.

The above and yet other objects and advantages of the present invention will become apparent from the hereinafter set forth Brief Description of the Drawings, Detailed Description of the Invention and Claims appended herewith.

DETAILED DESCRIPTION OF THE INVENTION

Figure 1:
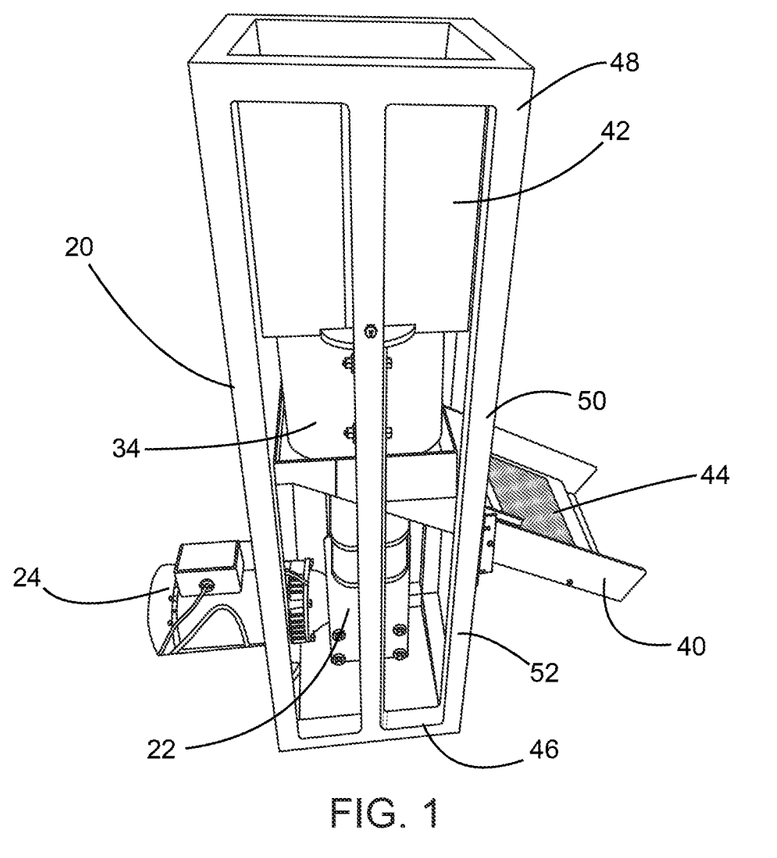
FIG. 1 is a conceptual view of the full system.
Figure 2:
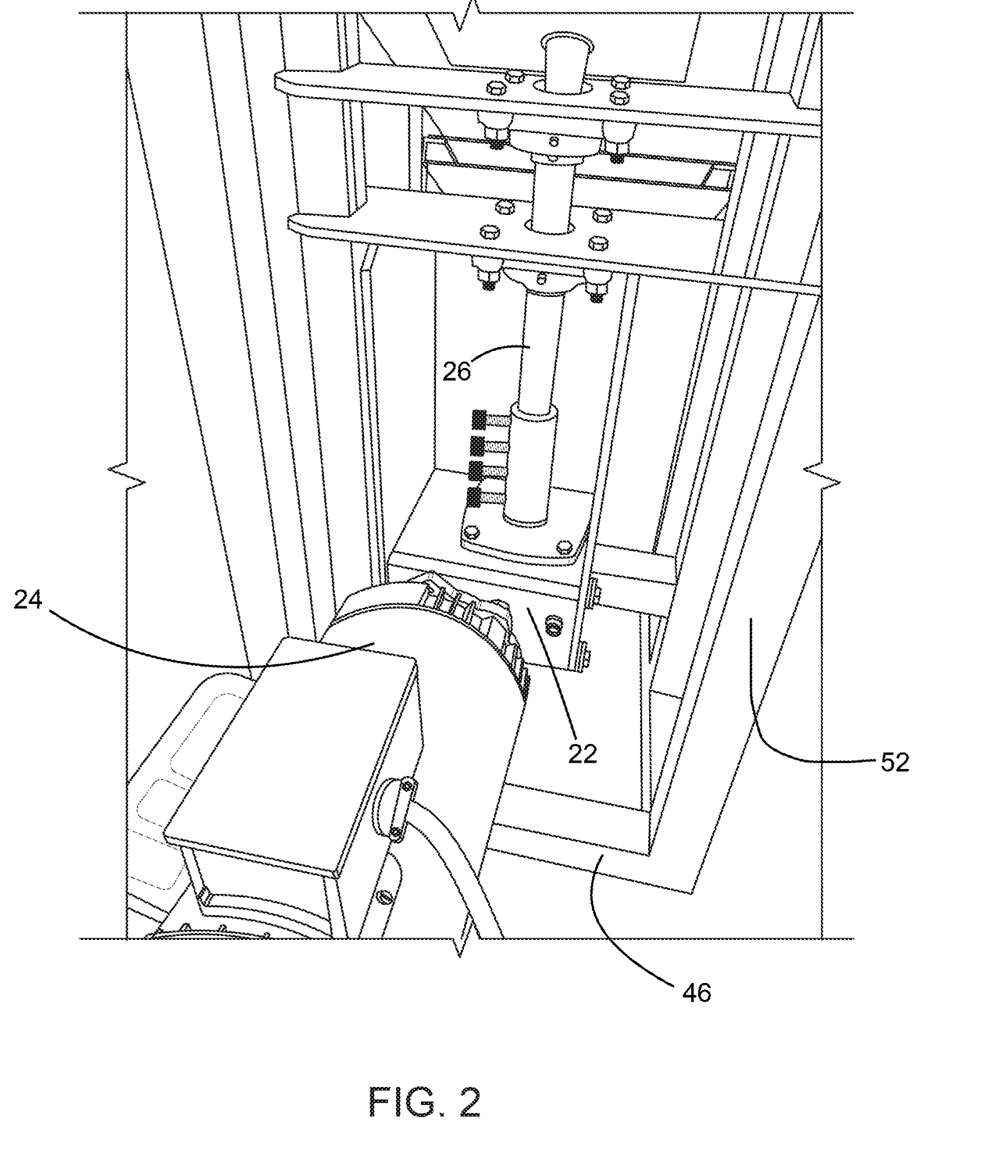
FIG. 2 is a perspective view focusing on the lower section of the housing.

Looking at the conceptual view in FIG. 1, a substantially hollow main housing 20 can be seen and should be viewed in terms of an upper section 48, midsection 50, lower section 52, and a base 46. Starting with the base 46 and lower section 52, a motor 24 is shown mounted horizontally with respect to the vertical members of the housing. The motor 24 is connected to a gear train within gear box 22 via a horizontal drive shaft which connects at a distal end of the gear train. The gear train further connects at a proximal end to a vertical drive shaft 26. As the motor 24 rotates the horizontal drive shaft, the motion is transferred via the gear train to the vertical driveshaft 26, shown in FIG. 2, which further connects to a frustoconical shaped rotor 28 which resides within the concentric cylindrical rotor housing 34 at the midsection 50 of the hollow main housing 20, shown in FIG. 3. Above the rotor 28 and midsection 50 of the hollow main housing 20, is the upper section 48 and hopper 42 within upper section 40.

Figure 3:
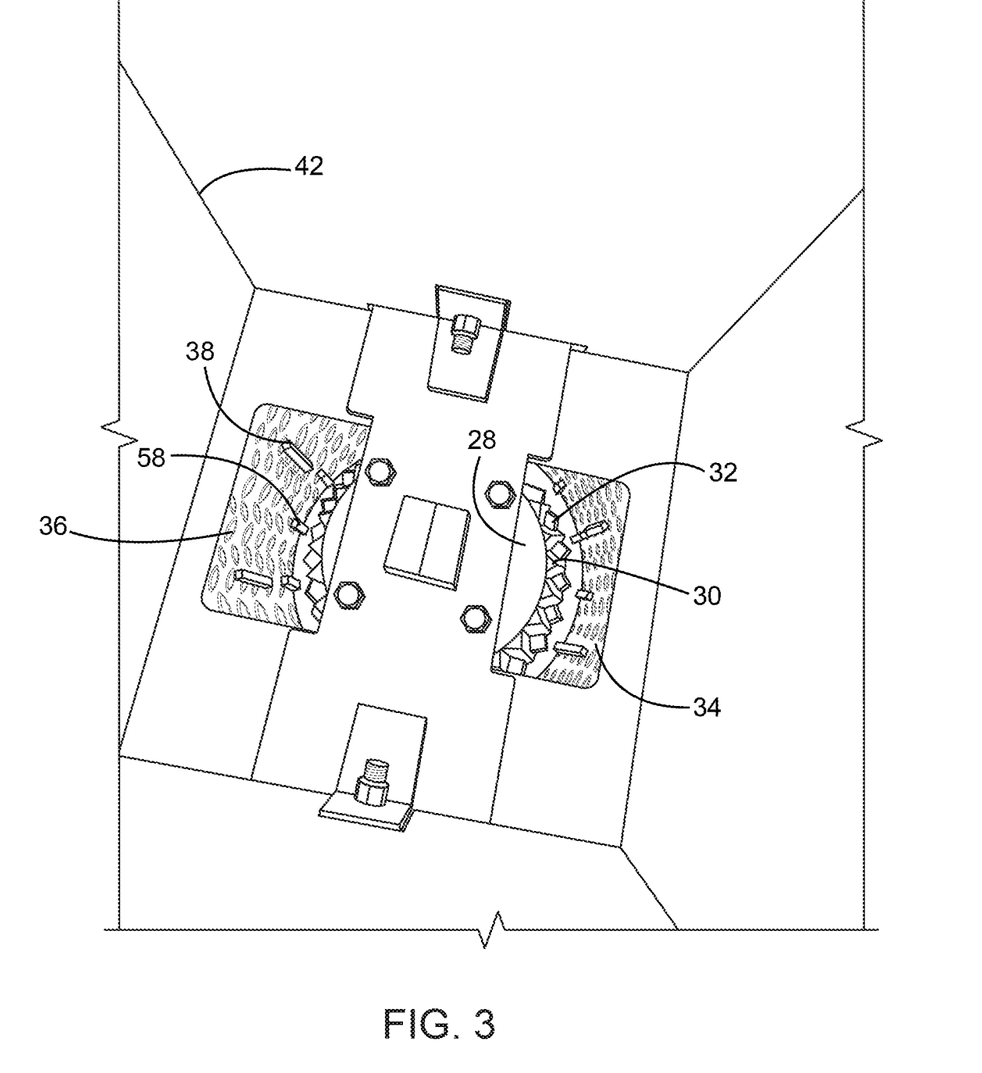
FIG. 3 is a downward perspective view of the upper section of the housing looking downward into the hopper.
Figure 4:
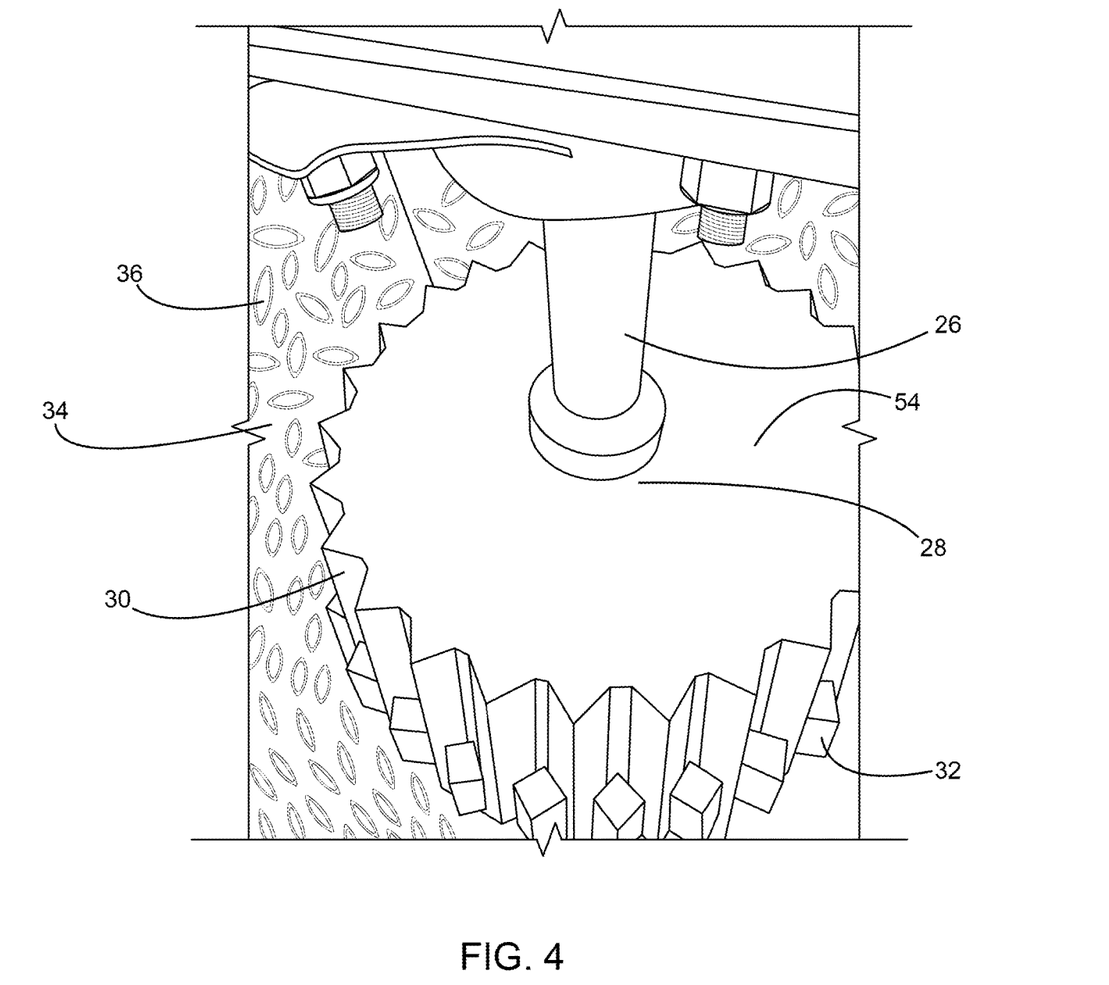
FIG. 4 is a perspective internal view of the midsection of the housing, focusing on the frustoconical rotor and the inner wall of the cylindrical rotor housing.
Figure 5:
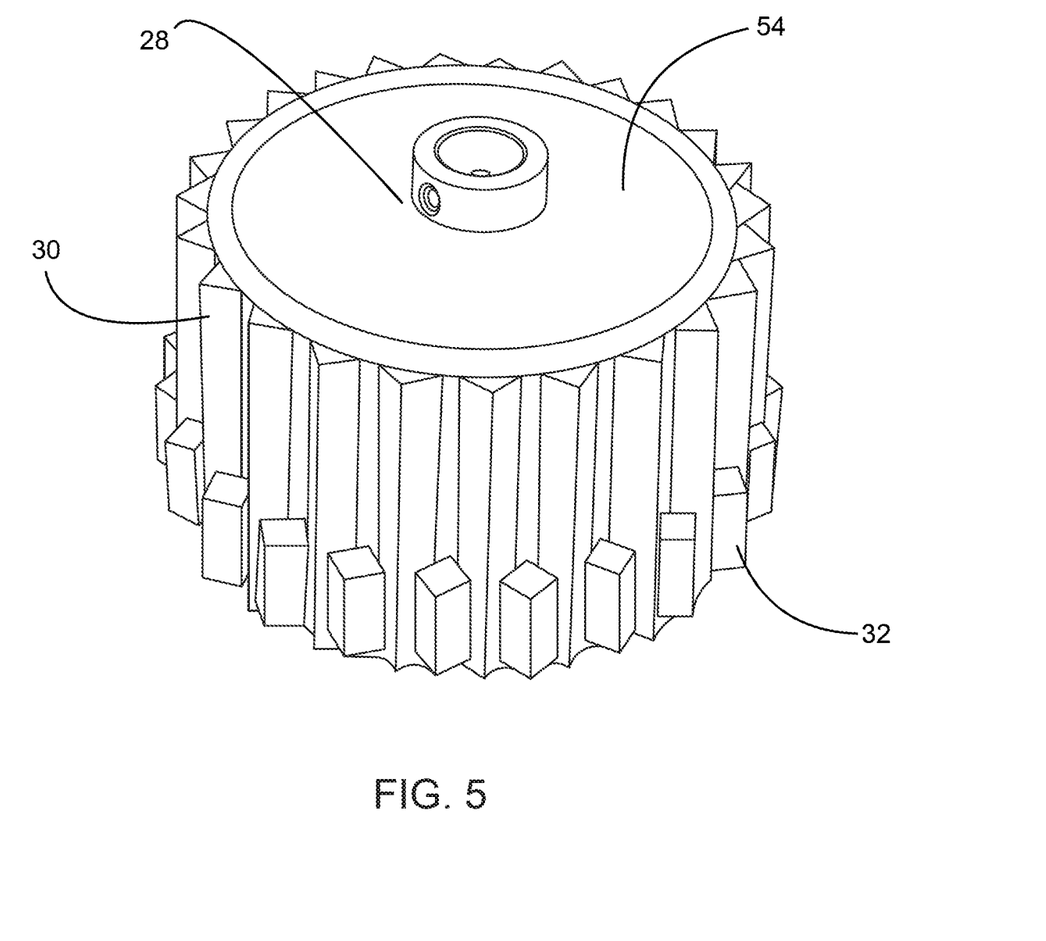
FIG. 5 is an isolated view of the frustoconical rotor, showcasing the side and top surface of the frustoconical rotor.
Figure 6:
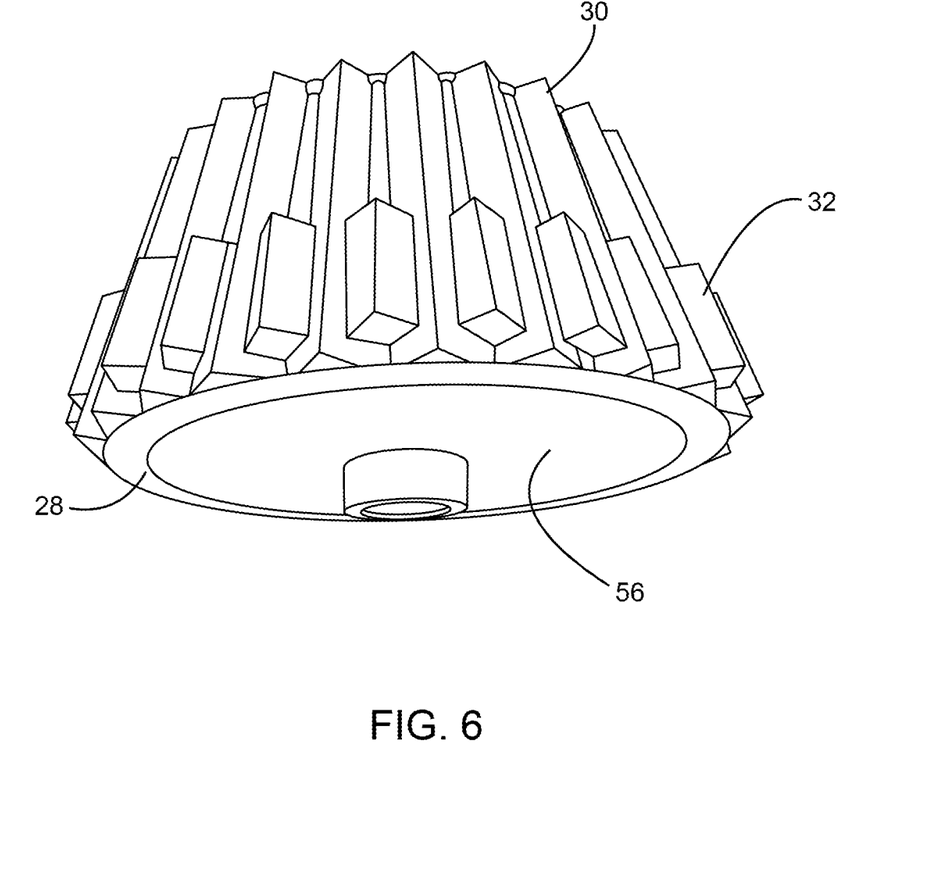
FIG. 6 is an additional isolated view of the frustoconical rotor shown in FIG. 5, but showcasing the side and bottom surface of the frustoconical rotor.

Focusing on the midsection 50 of the hollow main housing 20, FIGS. 3-6 showcase the concentric cylindrical rotor housing 34 and the rotor 28, the hard-shelled nut cracking elements. The frustoconical shape of the rotor 28 is configured in such a way that the diameter of the lower surface 56 is greater than that of the upper surface 54, seen in FIGS. 4 and 5. The side surface of the rotor is comprised of individual elongate edged bars 30 and short rectangular shaped bars 32, shown in FIG. 5. The elongate edged bars 30 are configured from upper surface 54 to lower surface 56 at an angle and the elongate edged bars 30 are positioned so that an edge is exposed. The geometry of the elongate edged bar 30 can either be triangular or rectangular, but it is imperative that an edge is exposed as shown in FIG. 3. The elongate edged bars 30 are spaced in such a manner to allow the hard-shelled nut to slide into the interstitial created between bars, further the spacing is configured to allow for short rectangular shaped bars to be fixed near the lower surface 56 of the rotor 28. In the preferred embodiment, the elongate edged bars are made of ½-inch by ½-inch mild steel. The short rectangular shaped bars 32 are made with a smaller rectangular rod in order to fit in the interstitials between the elongate edged rods 30. In a preferred embodiment, the interstitials are ¼-inch in width.

When the machine is operating, the user will insert hard-shelled nuts, more specifically black walnuts, into the hopper 42, Shown in FIG. 3. The hopper 42 has an upper opening and a lower opening. The hard-shelled nuts are free to fall into the concentric cylindrical rotor housing 34 where they will be guided by the rotor 28. As the nuts fall in gradually from the hopper, the preferred 2-horsepower motor 24 drives the gear train to transmits motion into the rotor 28, revolving at a preferred rate of about sixty revolutions per minute (rpm), delivering a preferred two thousand four hundred (2,400) foot-pounds (ft-lb) of torque. The hard-shelled nuts are cycled by the rotor until the hard-shelled nut is engaged and pressed in between the first stage cracking elements: small protrusions 36 and first stage vertical protrusions 38. The pressure exerted upon the shell of the nut from the rotation of the elongate edged bars 30 on one side of the nut and the pressure of either the small protrusions 36 or the first stage vertical protrusions 38 on the opposite side of the nut shell, causing the nut shell to crack and the meat to be removed from the inner parts of the nut shell.

To ensure smaller sized nuts or nuts that were not pressured against the wall in the first stage are also cracked, the hard-shelled nuts will pass second stage cracking elements: small protrusions 36 and second stage vertical protrusions 58. The second stage vertical protrusions 58 are positioned below the first stage vertical protrusions 38 in the lower section of the inner wall of the cylindrical rotor housing 34. The lower portions of the elongate edged rods 30 and the short rectangular rods 32 exert pressure upon the nut shell against the small protrusions 36 and the second stage vertical protrusions 58 until the pressure cracks the nut shell and the meat is removed from the inner parts of the shell.

It is important to note that a major difference between the present invention and the prior art is the vertical protrusion two stage cracking system. In a preferred embodiment, it is desired to include twice the number of second stage vertical protrusions 58 as there are first stage vertical protrusions 38. In such preferred embodiment, there are eight first stage vertical protrusions 38 above sixteen second stage vertical protrusions 58, each first and second stage protrusion spaced evenly apart from the next. It is also important to note that the small protrusions 36, that are shown on the inner wall of the concentric cylindrical rotor housing 34, are made of diamond plate pattern to allow for cracking even when the hard-shelled nuts are not in contact with either a first stage vertical protrusion 38 or second stage vertical protrusion 58. The invention is capable of hulling over ninety-nine percent of a full hopper 42 of black walnuts, in which the meat and shell residue are then able to fall onto the collection tray 40 and further on to the collection grate, seen in FIG. 1. This high efficiency was noted to be directly correlated to the pressure created by the strategic placement of the first and second stage cracking elements.

While there has been shown and described above the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

I claim:

1. A system for hard-shelled nut meat extraction, comprising:
    a substantially hollow main housing, said housing having an upper section, a lower section, a midsection, and a base;
    a gearbox contained within said lower section at said base of said housing;
    a motor having a horizontal drive shaft connected to a distal end of a gear train within said gearbox;
    a vertical drive shaft having an upper and a lower end, said vertical drive shaft connected at said lower end to a proximal end of a gear train within said gear box, said vertical drive shaft connected at said upper end to a substantially hollow frustoconical shaped rotor at said midsection of the housing;
    said rotor having an upper surface, a lower surface, and a side face;

said rotor having a multiplicity of elongate edged bars along said side face, each said elongate edged bar is spaced apart from the next;

said rotor having a multiplicity of short rectangular shaped bars with edges along said side face, each said short rectangular shaped bar is positioned in between said elongate edged bars at said lower surface, and said edges of said short rectangular shaped bars extend outward beyond that of said multiplicity of elongate edged bars;

a concentric cylindrical rotor housing, said rotor housing having an outer wall and an inner wall, said inner wall having a plurality of small protrusions, said small protrusions spaced about a flat surface of said inner wall;

said inner wall having a plurality of first stage vertical protrusions, said first stage vertical protrusions spaced evenly around a middle portion of said inner wall a substantial distance, whereby said substantial distance is configured to allow a black walnut to descend between said protrusions allowing for said black walnut to become wedged and crack under the pressure exerted by said rotor;

said inner wall having a plurality of second stage vertical protrusions, said second stage vertical protrusions spaced evenly around a lower portion of said inner wall a sufficient distance, whereby said sufficient distance is configured to allow larger black walnut remnants to descend between said protrusions allowing for said black walnut to become wedged and crack under the pressure exerted by said rotor;

a collection tray positioned directly below a bottom of said concentric cylindrical rotor housing; and a hopper with an upper opening, a lower opening, and a midsection, said midsection positioned at an end of said upper section of said substantially hollow main housing, said lower opening of said hopper exposed to said concentric cylinder.

2. The system as recited in claim 1, further comprising:
said substantially hollow main housing having a rectangular geometry.

3. The system as recited in claim 1, further comprising:
said elongate edged bars having a triangular geometry.

4. The system as recited in claim 1, further comprising:
said elongate edged bars having a rectangular geometry.

5. The system as recited in claim 1, further comprising:
said small protrusions within said inner wall of said concentric cylindrical rotor housing made of industrial diamond plate pattern.

6. The system as recited in claim 1, further comprising:
said gear train having a gear ratio of 30:1.

7. The system as recited in claim 1, further comprising:
said motor capable of providing at least 2400 foot-pounds of torque, said motor having horsepower within the range of one to three horse power.

8. The system as recited in claim 1, further comprising:
said collection tray having a ramp positioned at an angle between 15 and 65 degrees.

9. The system as recited in claim 6, further comprising:
a filter grate having a front, left, right, and back side, said filter grate having a flat bottom surface with holes and two solid vertical rails, said vertical rails connected to filter grate on the left and right side, said back side of said filter grate connected to said collection tray.

10. The system as recited in claim 9, further comprising:
said filter grate having a shield encapsulating said filter grate.

11. The system as recited in claim 10, further comprising:
a pneumatic gradient positioned underneath said filter grate for separating the shells from the meat.

12. The system as recited in claim 1, further comprising:
the system for hard-shelled nut meat extraction capable of extracting meat from black walnuts.

13. A system for hard-shelled nut meat extraction, comprising:

a substantially hollow main housing, said housing having an upper section, a lower section, a midsection, and a base;

a gearbox contained within said lower section at said base of said housing;

a motor having a horizontal drive shaft connected to a distal end of a gear train within said gearbox;

a vertical drive shaft having an upper and a lower end, said vertical drive shaft connected at said lower end to a proximal end of a gear train within said gear box, said vertical drive shaft connected at said upper end to a substantially hollow frustoconical shaped rotor at said midsection of the housing;

said rotor having an upper surface, a lower surface, and a side face;

said rotor having a multiplicity of elongate edged bars along said side face, each said elongate edged bar is spaced apart from the next;

said rotor having a multiplicity of short rectangular shaped bars along said side face, each said short rectangular shaped bar is positioned in between said elongate edged bars at said lower surface;

a concentric cylindrical rotor housing, said rotor housing having an outer wall and an inner wall, said inner wall having a plurality of small protrusions, said small protrusions spaced about a flat surface of said inner wall;

said inner wall having a plurality of first stage vertical protrusions, said first stage vertical protrusions spaced evenly around a middle portion of said inner wall;

said inner wall having a plurality of second stage vertical protrusions, said second stage vertical protrusions spaced evenly around a lower portion of said inner wall;

a collection tray positioned directly below a bottom of said concentric cylindrical rotor housing;

a hopper with an upper opening, a lower opening, and a midsection, said midsection positioned at an end of said upper section of said substantially hollow main housing, said lower opening of said hopper exposed to said concentric cylinder;

said gear train having a gear ratio of 30:1;

a filter grate having a front, left, right, and back side, said filter grate having a flat bottom surface with holes and two solid vertical rails, said vertical rails connected to filter grate on the left and right side, said back side of said filter grate connected to said collection tray.

14. A system for hard-shelled nut meat extraction, comprising:

a substantially hollow main housing, said housing having an upper section, a lower section, a midsection, and a base;

a gearbox contained within said lower section at said base of said housing;

a motor having a horizontal drive shaft connected to a distal end of a gear train within said gearbox;

a vertical drive shaft having an upper and a lower end, said vertical drive shaft connected at said lower end to a proximal end of a gear train within said gear box, said vertical drive shaft connected at said upper end to a substantially hollow frustoconical shaped rotor at said midsection of the housing;

said rotor having an upper surface, a lower surface, and a side face;

said rotor having a multiplicity of elongate edged bars along said side face, each said elongate edged bar is spaced apart from the next;

said rotor having a multiplicity of short rectangular shaped bars along said side face, each said short rectangular shaped bar is positioned in between said elongate edged bars at said lower surface;

a concentric cylindrical rotor housing, said rotor housing having an outer wall and an inner wall, said inner wall having a plurality of small protrusions, said small protrusions spaced about a flat surface of said inner wall;

said inner wall having a plurality of first stage vertical protrusions, said first stage vertical protrusions spaced evenly around a middle portion of said inner wall;

said inner wall having a plurality of second stage vertical protrusions, said second stage vertical protrusions spaced evenly around a lower portion of said inner wall;

a collection tray positioned directly below a bottom of said concentric cylindrical rotor housing;

a hopper with an upper opening, a lower opening, and a midsection, said midsection positioned at an end of said upper section of said substantially hollow main housing, said lower opening of said hopper exposed to said concentric cylinder;

said motor capable of providing at least 2400 foot-pounds of torque, said motor having horsepower within the range of one to three horse power; and a filter grate having a shield encapsulating said filter grate.

15. A system for hard-shelled nut meat extraction, comprising:

a substantially hollow main housing, said housing having an upper section, a lower section, a midsection, and a base;

a gearbox contained within said lower section at said base of said housing;

a motor having a horizontal drive shaft connected to a distal end of a gear train within said gearbox;

a vertical drive shaft having an upper and a lower end, said vertical drive shaft connected at said lower end to a proximal end of a gear train within said gear box, said vertical drive shaft connected at said upper end to a substantially hollow frustoconical shaped rotor at said midsection of the housing;

said rotor having an upper surface, a lower surface, and a side face;

said rotor having a multiplicity of elongate edged bars along said side face, each said elongate edged bar is spaced apart from the next;

said rotor having a multiplicity of short rectangular shaped bars along said side face, each said short rectangular shaped bar is positioned in between said elongate edged bars at said lower surface;

a concentric cylindrical rotor housing, said rotor housing having an outer wall and an inner wall, said inner wall having a plurality of small protrusions, said small protrusions spaced about a flat surface of said inner wall;

said inner wall having a plurality of first stage vertical protrusions, said first stage vertical protrusions spaced evenly around a middle portion of said inner wall;

said inner wall having a plurality of second stage vertical protrusions, said second stage vertical protrusions spaced evenly around a lower portion of said inner wall;

a collection tray positioned directly below a bottom of said concentric cylindrical rotor housing;

a hopper with an upper opening, a lower opening, and a midsection, said midsection positioned at an end of said upper section of said substantially hollow main housing, said lower opening of said hopper exposed to said concentric cylinder said collection tray having a ramp positioned at an angle between 15 and 65 degrees; and a pneumatic gradient positioned underneath a filter grate for separating the shells from the meat.

* * * * *